(12) United States Patent
Meena et al.

(10) Patent No.: US 9,556,328 B2
(45) Date of Patent: Jan. 31, 2017

(54) BIODEGRADABLE HYDROPHOBIC COMPOSITE MATERIALS AND PROCESS FOR THE PREPARATION THEREOF

(71) Applicant: COUNCIL OF SCIENTIFIC & INDUSTRIAL RESEARCH, New Delhi (IN)

(72) Inventors: Ramavatar Meena, Bhavnagar (IN); Pushpito Kumar Ghosh, Bhavnagar (IN); Dharmesh Chejara, Bhavnagar (IN); Karuppanan Eswaran, Bhavnagar (IN); Arup Kumar Siddhanta, Bhavnagar (IN); Kamalesh Prasad, Bhavnagar (IN); Jai Prakash Chaudhary, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 106 days.

(21) Appl. No.: 14/435,368

(22) PCT Filed: Oct. 11, 2013

(86) PCT No.: PCT/IN2013/000617
§ 371 (c)(1),
(2) Date: Apr. 13, 2015

(87) PCT Pub. No.: WO2014/057502
PCT Pub. Date: Apr. 17, 2014

(65) Prior Publication Data
US 2015/0274942 A1 Oct. 1, 2015

(30) Foreign Application Priority Data
Oct. 12, 2012 (IN) ............................ 3194/DEL/2012

(51) Int. Cl.
*C08L 5/00* (2006.01)
*B29C 39/00* (2006.01)
(Continued)

(52) U.S. Cl.
CPC ................ *C08L 5/00* (2013.01); *B29C 39/003* (2013.01); *C08B 37/0039* (2013.01);
(Continued)

(58) Field of Classification Search
CPC ................ C08L 5/00; C08L 5/04; C08L 5/12; B29K 2005/00; C29C 39/003; C08K 5/0016; C08K 5/053
(Continued)

(56) References Cited

U.S. PATENT DOCUMENTS 6,294,202 B1   9/2001   Burns et al.
2003/0118692 A1   6/2003   Wang et al.
(Continued)

FOREIGN PATENT DOCUMENTS

JP   2000-093080 A   4/2000
WO   2006059180 A2   6/2006

OTHER PUBLICATIONS

Xiao et al., "Chemical Modification of the Surface of Calcium Alginate Gel Beads," Chin. J. Polym.Sci., vol. 22, No. 2, 183-186 (2004).*
(Continued)

*Primary Examiner* — Susannah Chung
*Assistant Examiner* — Josephine Chang
(74) *Attorney, Agent, or Firm* — McDonald Hopkins LLC

(57) ABSTRACT

The present invention relates to biodegradable hydrophobic composite materials and a process for the preparation of said hydrophobic biodegradable materials from the seaweed polysaccharides through grafting reaction with vinylated monomers e.g. vinyl acetate. The said composites can be
(Continued)

used as a substitute for synthetic ropes for varied applications including seaweed cultivation in the open sea. The results of cultivation experiments showed that ropes are suitable for cultivation of seaweeds in the sea environment, and exhibit higher biomass yield as compared to synthetic ropes. The prepared composites are very flexible and can be used for making handles for carry bags and for the preparation of biodegradable designs, bowls, pots, jars, gift items, stud caps and bracelets.

8 Claims, 6 Drawing Sheets

(51) Int. Cl.
    *C08L 5/04*     (2006.01)
    *C08L 5/12*     (2006.01)
    *C08B 37/00*     (2006.01)
    *C08F 251/00*     (2006.01)
    *C08K 5/00*     (2006.01)
    *C08K 5/053*     (2006.01)
    *B29L 31/06*     (2006.01)

(52) U.S. Cl.
    CPC ...... *C08B 37/0042* (2013.01); *C08B 37/0084* (2013.01); *C08F 251/00* (2013.01); *C08K 5/0016* (2013.01); *C08K 5/053* (2013.01); *C08L 5/04* (2013.01); *C08L 5/12* (2013.01); *B29K 2005/00* (2013.01); *B29L 2031/06* (2013.01)

(58) Field of Classification Search
    USPC ...................................... 524/28, 27; 264/299
    See application file for complete search history.

(56) References Cited

U.S. PATENT DOCUMENTS

2004/0171545 A1    9/2004    Chaikof et al.
2005/0161857 A1    7/2005    Coombes et al.

OTHER PUBLICATIONS

Mishra, et al., Synthesis of graft copolymer (k-carrageenan-g-N, N-dimethylacrylamide and studies of metal ion uptake, swelling capacity and flocculation properties, Carbohydrate Polymers, 2008, pp. 524-534, vol. 71, Elsevier Science Ltd.

Karbowiak, et al., Effect of Plasticizers (Water and Glycerol) on the Diffusion of a Small Molecule in Iota-Carragennan Biopolymer Films for Edible Coating Application, Biomacromolecules, 2006, pp. 2011-2019, vol. 7, American Chemical Society.

Mateev, et al., The plasticizing effect of water on proteins, polysaccharides and their mixture. Glassy state of biopolymers, food and seeds, Food Hydrocolloids, 2000, pp. 425-437, vol. 14, Elsevier Science Ltd.

Trivedi, et al., Ceric-induced grafting of acrylonitrile onto sodium salt of partially carboxymethylated guar gum, Carbohydrate Polymers, 2005, pp. 117-125, vol. 60, Elsevier Science Ltd.

Athawale, et al., Free radical graft copolymerization of methacrylamide onto agar, European Polymer Journal, 1999, pp. 1237-1243, vol. 35, Elsevier Science Ltd.

Ying, et al., Stimuli-Responsive Recognition of BSA-Imprinted Poly Vinyl Acetate Grafted Calcium Alginate Core-Shell Hydrogel Microspheres, Journal of Applied Polymer Science, 2013, pp. 3898-3909, Wiley Online Library.

\* cited by examiner

BIODEGRADABLE HYDROPHOBIC COMPOSITE MATERIALS AND PROCESS FOR THE PREPARATION THEREOF

CROSS-REFERENCE TO RELATED APPLICATIONS

This application is a US 371 of International Application No. PCT/IN2013/000617, filed Oct. 11, 2013, entitled BIODEGRADABLE HYDROPHOBIC COMPOSITE MATERIALS AND PROCESS FOR THE PREPARATION THEREOF, which claims the benefit of IN Application No. 3194/DEL/2012, filed Oct. 12, 2012, entitled BIODEGRADABLE HYDROPHOBIC COMPOSITE MATERIALS AND PROCESS FOR THE PREPARATION THEREOF, the entireties of which are incorporated herein by reference.

FIELD OF THE INVENTION

The present invention relates to biodegradable hydrophobic composite materials and process for the preparation thereof. In particular, the present invention relates to a process for the preparation of controlled/completely hydrophobic biodegradable composites that can be used for varied applications including seaweed cultivation in the open sea. The prepared composites can be sterilised in water without solubilisation, are flexible and can be used for numerous applications including carry bag handles, bowls, pots, gift items, studs, accessories for ornaments, etc. along with the advantage that they can be safely and easily disposed off in the environment.

BACKGROUND OF THE INVENTION

Conventionally, ropes are made out of coconut fibre and other natural materials. Such ropes are widely used in seaweed cultivation, but in general, the durability of the ropes is low in seawater. Ropes are also available which are made up of synthetic/semi-synthetic fibres such as nylon, polyester, etc. Such ropes are routinely used in seaweed cultivation but their low/poor biodegradability is a great concern.

Reference may be made to the publication of Ghosh et al. (Polymer International, 53, 339-343; 2004) wherein it has been stated that grafting of vinyl acetate onto the low density polyethylene (LDPE)-starch blend films makes them suitable for printing and packaging applications. They used commercially available blend films made of synthetic polymer and starch under inert atmosphere using hazardous chemicals (e.g. $HNO_3$) during process, and used for printing and packaging applications. It is pertinent to mention here that the said reference does not mention the use of seaweed phycocolloids for making biodegradable hydrophobic composites for aqueous applications including seaweed cultivation.

Reference may be made to U.S. Pat. No. 6,294,202B1, wherein disclosed is a process for making water-insoluble biodegradable composition containing polyanionic polysaccharides and hydrophobic bioabsorbable polymers to prepare film, foam, mesh matte, or to cast on top of any surface. It is pertinent to mention here that the said reference reports the formation of compositions containing polyanionic polysaccharides and hydrophobic bioabsorbable polymers or copolymers. However, there is no report on the formation of biodegradable hydrophobic composites based on seaweed polysaccharides for novel applications including seaweed cultivation in sea water.

Reference may be made to US20040171545A1, wherein synthetic protein copolymers with plastic and elastic properties, and methods producing the copolymers, are disclosed. The process producing synthetic protein copolymer comprising at least one hydrophilic block and at least one hydrophobic block. It is pertinent to mention here that the said reference reports the formation of synthetic protein copolymers with plastic and elastic properties and does not describe any composition or process for the preparation of biodegradable hydrophobic composites based on seaweed phycocolloids for potential applications including seaweed cultivation.

Reference may be made to US20050161857A1, wherein recited is a method of producing a polymeric fibre (poly caprolactone) comprising: dissolving at least one fibre forming polymer in a solvent so as to form a polymer solution, and feeding the polymer solution under gravity through an orifice directly into a non-solvent to cause formation of a polymeric fibre in the non-solvent. It is pertinent to mention here that the said reference reports the formation of polymeric fibres from the synthetic polymer (e.g. poly-caprolactone) and does not describe any composition or process for the preparation of biodegradable hydrophobic composites based on seaweed phycocolloids.

Reference may be made to US20030118692A1, wherein reported is a method for the preparation of biodegradable elastomeric material from glycerol and diacid like malonic acid, succinic acid, adipic acid, glutaric acid, pimelic acid etc. to prepare different shapes of particles, tubes, spheare, strand, coiled strands capillary network, film, fibers, mesh and sheet. It is pertinent to mention here that the said reference reports the formation of biodegradable elastomeric materials using glycerol and diacids and does not describe any composition or process for the preparation of biodegradable hydrophobic composites based on seaweed phycocolloids for novel applications including seaweed cultivations in sea water.

Reference may be made to JP2000-093080, wherein disclosed is the use of polysaccharides like polyvinyl alcohol, polyvinyl pyrrolidone, sodium alginate, etc. in preparation of antibacterial and antifungal agent composition, which is soluble when used. It is pertinent to mention here that the said reference reports the formation of soluble materials and does not describe any composition or process for the preparation of biodegradable hydrophobic composites which are insoluble in water.

Reference may be made to Polymer International. 2001 50: 1103-1108, wherein use of poly(vinyl alcohol) and K-carrageenan in preparation of films based on poly(vinyl alcohol)/K-carrageenan blends and their gelling properties is reported. However, there is no report on the formation of hydrophobic materials including ropes and other materials in this article.

Reference may be made to WO 2006059180 A3, wherein use of inexpensive semi-refined kappa carrageenan as a seaweed polysaccharide in preparation of tough, biodegradable films with improved performance over films obtained from refined kappa carrageenan is disclosed. However, these films are highly moisture sensitive and readily soluble in water and thus cannot be applied in activities such as seaweed cultivation in open sea water environment.

In short, it may be summarized that the hitherto reported prior art shows that the polymeric composites prepared from purely petrochemical substances or entirely natural substance have some inherent drawbacks. Totally synthetic polymeric materials have problems of degradation, while natural polymeric materials are highly moisture sensitive and not suitable for aqueous applications owing to their solubility. For instance, seaweed derived phycocolloids such as agar, carrageenans, agarose, alginate are excellent gel formers and used as thickeners, but are highly moisture sensitive. Further, due to their high solubility in water and hydrophilic nature, these can be used only for the formation of films and are not good for aqueous applications because the hitherto reported composites made from them readily solubilise in water. In order to be eco-friendly as well as suitable for applications in water the composites must be hydrophobic.

Therefore, the inventors of the present invention realized that there exists a dire need to solve the issues discussed above and provide a composite through copolymerisation technique, to obtain controlled/completely hydrophobic biodegradable materials. It is evident from the prior art that there are no examples wherein polymers derived from seaweeds are utilised for preparation of hydrophobic composite materials which can be used for varied aqueous applications including seaweed cultivation in the sea water conditions.

OBJECTIVES OF THE INVENTION

The main object of the present invention is to provide composite materials which are biodegradable as well as water resistant i.e. exhibit hydrophobicity.

Another object of the present invention is to provide a process for the preparation of such hydrophobic biodegradable composites.

Still another object of the invention is to provide said hydrophobic composites using hydrophilic natural polymers and synthetic organic monomers.

Yet another object of the invention is to prepare ropes from the developed composites in a manner such that they are suitable for seaweed cultivation, are durable during use and at the same time, can be made to biodegrade in the soil/sea bottom.

Still another object of the invention is to provide a process for the preparation of the said composites wherein hydrophobicity is imparted by introducing vinylated monomers through chemical interventions.

SUMMARY OF THE INVENTION

The present invention relates to biodegradable hydrophobic composite materials and process for the preparation thereof. The invention further relates to the preparation of hydrophobic biodegradable composites from natural polymers such as the seaweed polysaccharides through grafting reaction with vinylated monomers e.g. vinyl acetate. The developed composites can be moulded in the form of ropes, which can be used as a substitute of synthetic ropes for varied applications including seaweed cultivation in the open sea. The results of cultivation experiments showed that the prepared ropes are suitable for cultivation of seaweeds in the sea environment, and yield higher biomass as compared to the braiders or nylon ropes. These ropes are very flexible and can also be used for making handles for carry bags, small ladies bags, and small school children bags. In addition, they can also be used for the preparation of designs on bowls, pots, jars and gift items like rings and bracelets.

In an embodiment, the present invention provides a process which uses agar, agarose, alginate and carrageenan alone as the seaweed polymers or uses combination of agar, agarose, alginate and carrageenan as the seaweed polymers.

In another embodiment, the present invention provides a process which makes the hydrophilic polymers hydrophobic so as to tolerate seawater conditions.

In still another embodiment, the present invention provides a process which imparts such hydrophobicity through grafting of vinylated monomers.

In yet another embodiment, the present invention provides a process which imparts complete hydrophobicity through grafting of vinyl acetate and other such monomers.

In still another embodiment, the present invention provides a process which tests the durability and efficacy of these composites in seawater and dry conditions.

In yet another embodiment, the present invention provides a process which demonstrates the biodegradability of the composites in soil.

In a further embodiment of the present invention, the ropes are prepared from seaweed polymer in a manner such that they are suitable for the preparation of biodegradable handles for carry bags.

In another embodiment of the present invention, the ropes are prepared from seaweed polymer in a manner such that they are suitable for the preparation of biodegradable bowls, pots or jars for storage of food and non-food items.

In still another embodiment of the present invention, the ropes are prepared from seaweed polymer in a manner such that they are suitable for the preparation of biodegradable flower pots or jars for decoration.

In yet another embodiment of the present invention, the ropes are prepared from seaweed polymer in a manner such that they are suitable for the preparation of designs on traditional items such as belts, bags and other small modern and fashionable items.

In still another embodiment of the present invention, the ropes are prepared from seaweed polymer in a manner such that they are suitable for the preparation of colored biodegradable ropes.

In yet another embodiment of the present invention, the biodegradable ropes with controlled/complete hydrophobicity may be obtained from agar, agarose, carrageenans and alginate as well as their hybrid blends and more particularly agar and agarose.

In still another embodiment of the present invention, the microwave/conventional/autoclave heating is carried out at a temperature in the range of 100 to 120 degree Celsius for a period of 10 to 30 minutes to dissolve the seaweed polysaccharides or their blends and more particularly 15 minutes to obtain a homogeneous solution.

In yet another embodiment of the present invention, the autoclave treatment is done at a temperature in the range of 100 to 120 degree Celsius to dissolve the seaweed polysaccharides or their blends for 10 to 30 minutes and more particularly 25 minutes to obtain a homogeneous solution.

In still another embodiment of the present invention, the water soluble initiator potassium persulphate (KPS) is added to the polymer mixture in the range of 0.01% to 0.04 wt % for the formation of active sites for grafting and more particularly 0.02 wt %.

In yet another embodiment of the present invention, the water soluble initiator potassium persulphate (KPS) is added to the polymer mixture at a temperature in the range of 60 to 90 degree Celsius under stirring.

In still another embodiment of the present invention, the vinylated monomer is added in the polymer and initiator KPS mixture in the range of 2 to 16 wt % and more particularly 6 wt %.

In yet another embodiment of the present invention, the vinylated monomer is added in the polymer and initiator KPS mixture in the temperature range of 60 to 85 degree Celsius under stirring for grafting with polymers present in the reaction mixture, more particularly at 80 degree Celsius.

In still another embodiment of the present invention, the biodegradable composites with complete/controlled hydrophobicity is obtained by grafting of agar, agarose, carrageenan and alginate as well as their hybrids with vinylated monomers, preferably vinyl acetate.

In yet another embodiment of the present invention, the biodegradable composites with complete hydrophobicity is obtained by grafting of agar or agarose as well as their hybrids with vinyl acetate.

In still another embodiment of the present invention, the additive glycerol is added in the temperature range of 60 to 90 degree Celsius under stirring to inhibit the brittleness of the resulting ropes.

In yet another embodiment of the present invention, the resulting molded composites are treated with organic solvents to remove the excess amount of unreacted monomer as well as water under ambient conditions.

In still another embodiment of the present invention, the organic solvent used is selected from the group consisting of acetone, methanol, ethanol, iso-propyl alcohol, ethyl acetate and tetra hydro furan (THF).

In yet another embodiment of the present invention, the solvent treated composites are dried in air followed by an optional oven drying at 50 degree Celsius for 2 hours.

In still another embodiment of the present invention, the seaweed polysaccharides are chemically hydrophobised to have the controlled/complete hydrophobicity.

In yet another embodiment of the present invention, the biodegradable composites prepared from agar or agarose or carrageenans or their blends are suitable for seaweed cultivation in open sea water environment.

In still another embodiment of the present invention, the quality of biodegradable composites is same after recovering from the sea water environment after 45 days or after first harvest of the seaweed.

In yet another embodiment of the present invention, the biodegradable composites prepared from seaweed polysaccharides or their blends are suitable for the preparation of biodegradable carry bags handles, bowl, pots, designs, ornaments accessories, etc.

In still another embodiment of the present invention, the quality of biodegradable composites in the form of handles, bowl, pots, designs, ornaments accessories, etc. is same after storing in ambient conditions or using longer time up to more than one year.

In yet another embodiment of the present invention, the biodegradable composites are easy to dispose off in the open environment.

In one embodiment, the hydrophobic biodegradable composite comprises [a] a seaweed derived polysaccharide in the range of 30 to 80 wt %; [b] a vinylated monomer in the range of 8 to 60 wt %; and [c] a plasticizer in the range of 2 to 15 wt %; wherein, the moisture content of said composites is in the range of 5 to 15 wt %. The seaweed derived polysaccharide may be used alone or as a blend or combination of seaweed derived polysaccharides.

In another embodiment, the seaweed derived polysaccharides are selected from the group consisting of agar, agarose, alginate, and carrageenan.

In yet another embodiment, wherein the seaweed derived polysaccharide is agar and/or agarose.

In one embodiment, the vinylated monomer is vinyl acetate.

In another embodiment, the plasticizer is selected from the group consisting of glycerol, ethylene glycol, and sorbitol. In one embodiment, the plasticizer is glycerol In one embodiment, the present invention provides a process for the preparation of the composites described above. The process may comprise [a] dissolving 1 to 8 wt % of seaweed polysaccharides or their blends in distilled water by heating at a temperature in the range of 100 to 120 degrees Celsius for 5 to 30 minutes to obtain a homogeneous solution; [b] adding 0.01 to 0.10 wt % potassium persulphate to the homogeneous solution as obtained in step [a] under stirring followed by addition of 2 to 16 wt % vinylated monomers and heating at a temperature in the range of 60 to 85 degrees Celsius in aqueous medium under reflux conditions for 3 to 7 hours under constant stirring to obtain a reaction mixture; [c] adding 0.5 to 5.0 wt % plasticizers into the reaction mixture as obtained in step [b] and transferring the contents into desired hollow or tubular devices and/or moulds to obtain moulded composites; [d] treating the moulded composites as obtained in step [c] with organic solvent at a temperature in the range of 20 to 30 degrees Celsius to remove unreacted homopolymer followed by air drying to obtain desired hydrophobic biodegradable composites.

In one embodiment the hollow or tubular devices and/or moulds are made of glass, plastic, steel, or wood.

In yet another embodiment, the organic solvent is selected from the group consisting of isopropyl alcohol, acetone, methanol, ethanol, ethyl acetate, and tetra hydro furan

BRIEF DESCRIPTION OF ACCOMPANYING DRAWINGS

DETAILED DESCRIPTION OF THE INVENTION

Figure 1:
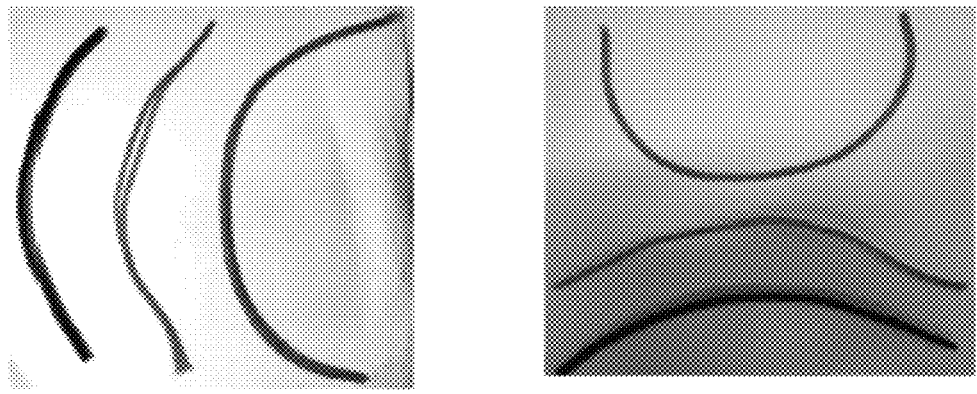
FIG. 1 illustrates the biodegradable hydrophobic or controlled hydrophobic composites based colored ropes or rods, suitable for making decorative items, coloured handles for carry bags, ornaments accessories, etc.

The seaweed derived phycocolloids used for the purposes of the present invention are selected from agar bacteriological (product code: 0140132), agarose (product code: 014011) and alginate (product code: 1947295) which were commercially procured from M/s Sisco Research Laboratories (SRL) Pvt. Ltd. Mumbai-400 093, Maharashtra, India, and semi refined carrageenan (product code: Aqua gel 250) which was commercially procured from M/s Aquagri Processing Pvt. Ltd., New Delhi, India.

The present invention relates to biodegradable composite materials of controlled hydrophobicity exhibiting high mechanical strength and good flexibility. The invention also describes a facile, eco-friendly and one-step process for the preparation of the said materials from the seaweed polysaccharides and their blends through chemical reaction with vinylated monomers like vinyl acetate, acrylamide and acetonitrile. According to a non-limiting exemplary embodiment, the said process comprises: dissolving 1 to 10 wt % of seaweed polysaccharides namely agar, carrageenans, alginate, agarose or their blends in distilled water by microwave heating at 100 degree Celsius for 5 to 15 minutes or by autoclaving at 120 degree Celsius for 30 minutes to obtain a homogeneous solution, adding 0.01 to 0.10 wt % of potassium persulphate (KPS) under stirring to said solution followed by addition of 2 to 16 wt % vinylated monomers, heating the reaction mixture in aqueous medium under reflux conditions at 60 to 85 degree Celsius for 3 to 7 hours with constant stirring, adding 0.5 to 2.0 wt % of plasticizers selected from glycerol, sorbitol, ethylene glycol or other polyols into the reaction mixture and transferring the contents to the desired hollow or tubular devices/moulds made of glass or metal to obtain the desired moulded composites in various shapes, treating the resulting moulded composites with organic solvent at a temperature in the range of 20 to 30 degree Celsius so as to remove the unreacted homopolymer followed by air drying under ambient conditions to yield the desired biodegradable hydrophobic composites suitable for multifarious applications including seaweed cultivation in the open seawater environment.

EXAMPLES

The following examples are given by way of illustration and therefore should not be construed to limit the scope of the present invention.

Example 1

Seaweed phycocolloid (SP) agarose (2 wt %) was dissolved in water by microwave (MW) heating at 100 degree Celsius for 15 minutes. To this, 0.02 wt % potassium persulphate (KPS) was added under stirring, followed by addition of 4 wt % acrylamide (AAm). The reaction mixture was heated in aqueous medium under reflux conditions at 80 degree Celsius for 5 h with constant stirring. 0.5 wt % glycerol was added into the heated reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water sensitive biodegradable composites named as Agarose/PAAm-composite (Ia). It was observed that the prepared composites were not hydrophobic and thus not suitable to be used for applications such as seaweed cultivation.

TABLE 1

Effect of different reaction parameters and other variables in Example 1.

| Seaweed phycocolloid (wt %) | AAm (wt %) | KPS (wt %) | Plasticizer (wt %) | Remarks/Observations |
|---|---|---|---|---|
| Agar (2) | 4 | 0.02 | 0.5 | This produced water sensitive biodegradable composites named as Agar/PAAm-composite (Ib). It was observed that the prepared composites were not hydrophobic and thus not suitable to be used for applications such as seaweed cultivation. |
| Semi-refined carrageenan (SRC) (2) | 4 | 0.02 | 0.5 | This produced water sensitive biodegradable composites named as SRC/PAAm-composite (Ic). It was observed that the prepared composites were not hydrophobic and thus not suitable to be used for applications such as seaweed cultivation. |
| Alginate (2) | 4 | 0.02 | 0.5 | This produced highly water sensitive biodegradable composites named as Alginate/PAAm-composite (Id). It was observed that the prepared composites were not hydrophobic and thus not suitable to be used for applications such as seaweed cultivation. |

Example 2

Experiments of Example 1 were repeated taking seaweed phycocolloid agarose (4 wt %) which was dissolved in water by autoclave heating at 120 degree Celsius for 30 minutes. To this, 0.02 wt % potassium persulphate (KPS) was added under stirring, followed by addition of 8 wt % acrylamide (AAm). The reaction mixture was heated in aqueous medium under reflux conditions at 80 degree Celsius for 5 h with constant stirring. 0.5 wt % glycerol was added into the heated reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water sensitive biodegradable composites named as Agarose/PAAm-composites (IIa). It was observed that the prepared composites were not hydrophobic and thus not suitable to be used for applications such as seaweed cultivation.

TABLE 2

Effect of different reaction parameters and other variables in Example 2.

| Seaweed phycocolloid (wt %) | AAm (wt %) | KPS (wt %) | Plasticizer (wt %) | Remarks/Observations |
|---|---|---|---|---|
| Agar (4) | 8 | 0.02 | 0.5 | This produced water sensitive biodegradable composites named as Agar/PAAm-composite (IIb). It was observed that the prepared composites were not hydrophobic and thus not suitable to be used for applications such as seaweed cultivation. |
| Semi-refined carrageenan (SRC) (4) | 8 | 0.02 | 0.5 | This produced water sensitive biodegradable composites named as SRC/PAAm-composite (IIc). It was observed that the prepared composites were not hydrophobic and thus not suitable to be used for applications such as seaweed cultivation. |
| Alginate (4) | 8 | 0.02 | 0.5 | This produced highly water sensitive biodegradable composites named as Alginate/PAAm-composite (IId). It was observed that the prepared composites were not hydrophobic and thus not suitable to be used for applications such as seaweed cultivation. |

Example 3

Experiments of Example 1, were repeated taking seaweed phycocolloid agarose (6 wt %) which was dissolved in water by autoclave heating at 120 degree Celsius for 30 minutes. To this 0.02 wt % potassium persulphate (KPS) was added under stirring, followed by addition of 16 wt % acrylamide (AAm). The reaction mixture was heated in aqueous medium under reflux conditions at 80 degree Celsius for 5 h with constant stirring. 0.5 wt % glycerol was added into the heated reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water sensitive biodegradable composites named as Agarose/PAAm-composites (IIIa). It was observed that the prepared composites were not hydrophobic and thus not suitable to be used for applications such as seaweed cultivation.

Example 4

Experiments of Example 1, were repeated taking seaweed phycocolloid agarose (2 wt %) which was dissolved in water by microwave heating at 100 degree Celsius for 15 minutes. To this 0.02 wt % potassium persulphate (KPS) was added under stirring, followed by the addition of 4 wt % acrylonitrile (ACN). The reaction mixture was heated in aqueous medium under reflux conditions at 80 degree Celsius for 5 h with constant stirring. 0.5 wt % glycerol was added into the heated reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water sensitive biodegradable composites named as Agarose/PACN-composites (IVa). It was observed that the prepared composite was not hydrophobic and thus not suitable to be used for applications such as seaweed cultivation.

TABLE 3

Effect of different reaction parameters and other variables in Example 3.

| Seaweed phycocolloid (wt %) | AAm (wt %) | KPS (wt %) | Plasticizer (wt %) | Remarks/Observations |
|---|---|---|---|---|
| Agar (6) | 16 | 0.02 | 0.5 | This produced water sensitive biodegradable composites named as Agar/PAAm-composite (IIIb). It was observed that the prepared composites were not hydrophobic and thus not suitable to be used for applications such as seaweed cultivation. |
| Semi-refined carrageenan (SRC) (6) | 16 | 0.02 | 0.5 | This produced water sensitive biodegradable composites named as SRC/PAAm-composite (IIIc). It was observed that the prepared composites were not hydrophobic and thus not suitable to be used for applications such as seaweed cultivation. |
| Alginate (6) | 16 | 0.02 | 0.5 | This produced highly water sensitive biodegradable composites named as Alginate/PAAm-composite (IIId). It was observed that the prepared composites were not hydrophobic and thus not suitable to be used for applications such as seaweed cultivation. |

TABLE 4

Effect of different reaction parameters and other variables in Example 4.

| Seaweed phycocolloid (wt %) | ACN (wt %) | KPS (wt %) | Plasticizer (wt %) | Remarks/Observations |
|---|---|---|---|---|
| Agar (2) | 4 | 0.02 | 0.5 | This produced water sensitive biodegradable composites named as Agar/PACN-composite (IVb). It was observed that the prepared composites were not hydrophobic and thus not suitable to be used for applications such as seaweed cultivation. |
| Semi-refined carrageenan (SRC) (2) | 4 | 0.02 | 0.5 | This produced water sensitive biodegradable composites named as SRC/PACN-composite (IVc). It was observed that the prepared composites were not hydrophobic and thus not suitable to be used for applications such as seaweed cultivation. |
| Alginate (2) | 4 | 0.02 | 0.5 | This produced highly water sensitive biodegradable composites named as Alginate/PACN-composite (IVd). It was observed that the prepared composites were not hydrophobic and thus not suitable to be used for applications such as seaweed cultivation. |

Example 5

Experiments of Example 2, were repeated taking seaweed phycocolloid agarose (4 wt %) which was dissolved in water by autoclave heating at 120 degree Celsius for 30 minutes. To this 0.02 wt % potassium persulphate (KPS) was added under stirring, followed by addition of 8 wt % acrylonitrile (ACN). The reaction mixture was heated in aqueous medium under reflux conditions at 80 degree Celsius for 5 h with constant stirring. 0.5 wt % glycerol was added into the heated reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water sensitive biodegradable composites named as Agarose/PACN-composites (Va). It was observed that the prepared composites were not hydrophobic and thus not suitable to be used for applications such as seaweed cultivation.

Example 6

Experiments of Example 3, were repeated taking seaweed phycocolloid agarose (6 wt %) which was dissolved in water by autoclave heating at 120 degree Celsius for 30 minutes. To this 0.02 wt % potassium persulphate (KPS) was added under stirring, followed by addition of 16 wt % acrylonitrile (ACN). The reaction mixture was heated in aqueous medium under reflux conditions at 80 degree Celsius for 5 h with constant stirring. 0.5 wt % glycerol was added into the heated reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water sensitive biodegradable composites named as Agarose/PACN-composites (VIa). It was observed that the prepared composites were not hydrophobic and thus not suitable to be used for applications such as seaweed cultivation.

TABLE 5

Effect of different reaction parameters and other variables in Example 5.

| Seaweed phycocolloid (wt %) | ACN (wt %) | KPS (wt %) | Plasticizer (wt %) | Remarks/Observations |
|---|---|---|---|---|
| Agar (4) | 8 | 0.02 | 0.5 | This produced water sensitive biodegradable composites named as Agar/PACN-composite (Vb). It was observed that the prepared composites were not hydrophobic and thus not suitable to be used for applications such as seaweed cultivation. |
| Semi-refined carrageenan (SRC) (4) | 8 | 0.02 | 0.5 | This produced water sensitive biodegradable composites named as SRC/PACN-composite (Vc). It was observed that the prepared composites were not hydrophobic and thus not suitable to be used for applications such as seaweed cultivation. |
| Alginate (4) | 8 | 0.02 | 0.5 | This produced highly water sensitive biodegradable composites named as Alginate/PACN-composite (Vd). It was observed that the prepared composites were not hydrophobic and thus not suitable to be used for applications such as seaweed cultivation. |

TABLE 6

Effect of different reaction parameters and other variables in Example 6.

| Seaweed phycocolloid (wt %) | ACN (wt %) | KPS (wt %) | Plasticizer (wt %) | Remarks/Observations |
|---|---|---|---|---|
| Agar (6) | 16 | 0.02 | 0.5 | This produced water sensitive biodegradable composites named as Agar/PACN-composite (VIb). It was observed that the prepared composites were not hydrophobic and thus not suitable to be used for applications such as seaweed cultivation. |
| Semi-refined carrageenan (SRC) (6) | 16 | 0.02 | 0.5 | This produced water sensitive biodegradable composites named as SRC/PACN-composite (VIc). It was observed that the prepared composites were not hydrophobic and thus not suitable to be used for applications such as seaweed cultivation. |
| Alginate (6) | 16 | 0.02 | 0.5 | This produced highly water sensitive biodegradable composites named as Alginate/PACN-composite (VId). It was observed that the prepared composites were not hydrophobic and thus not suitable to be used for applications such as seaweed cultivation. |

Example 7

Experiments of Example 1, were repeated taking seaweed phycocolloid agarose (2 wt %) which was dissolved in water by microwave heating at 100 degree Celsius for 15 minutes. To this 0.02 wt % potassium persulphate (KPS) was added under stirring, followed by the addition of 2 wt % polyvinyl alcohol (PVA). The reaction mixture was heated in aqueous medium under reflux conditions at 80 degree Celsius for 5 h with constant stirring. 0.5 wt % glycerol was added into the heated reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water sensitive biodegradable composites named as Agarose/PVA-composites (VIIa). It was observed that the prepared composites were not hydrophobic and thus not suitable to be used for applications such as seaweed cultivation.

Example 8

Experiments of Example 2, were repeated taking seaweed phycocolloid agarose (4 wt %) which was dissolved in water by autoclave heating at 120 degree Celsius for 30 minutes. To this 0.02 wt % potassium persulphate (KPS) was added under stirring, followed by addition of 8 wt % PVA. The reaction mixture was heated in aqueous medium under reflux conditions at 80 degree Celsius for 5 h with constant stirring. 0.5 wt % glycerol was added into the heated reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water sensitive biodegradable composites named as Agarose/PVA-composites (VIIIa). It was observed that the prepared composites were not hydrophobic and thus not suitable to be used for applications such as seaweed cultivation.

TABLE 7

Effect of different reaction parameters and other variables in Example 7.

| Seaweed phycocolloid (wt %) | PVA (wt %) | KPS (wt %) | Plasticizer (wt %) | Remarks/Observations |
|---|---|---|---|---|
| Agar (2) | 2 | 0.02 | 0.5 | This produced water sensitive biodegradable composites named as Agar/PVA-composite (VIIb). It was observed that the prepared composites were not hydrophobic and thus not suitable to be used for applications such as seaweed cultivation. |
| Semi-refined carrageenan (SRC) (2) | 2 | 0.02 | 0.5 | This produced water sensitive biodegradable composites named as SRC/PVA-composite (VIIc). It was observed that the prepared composites were not hydrophobic and thus not suitable to be used for applications such as seaweed cultivation. |
| Alginate (2) | 2 | 0.02 | 0.5 | This produced highly water sensitive biodegradable composites named as Alginate/PVA-composite (VIId). It was observed that the prepared composites were not hydrophobic and thus not suitable to be used for applications such as seaweed cultivation. |

TABLE 8

Effect of different reaction parameters and other variables in Example 8.

| Seaweed phycocolloid (wt %) | PVA (wt %) | KPS (wt %) | Plasticizer (wt %) | Remarks/Observations |
|---|---|---|---|---|
| Agar (4) | 8 | 0.02 | 0.5 | This produced water sensitive biodegradable composites named as Agar/PVA-composite (VIIIb). It was observed that the prepared composites were not hydrophobic and thus not suitable to be used for applications such as seaweed cultivation. |
| Semi-refined carrageenan (SRC) (4) | 8 | 0.02 | 0.5 | This produced water sensitive biodegradable composites named as SRC/PVA-composite (VIIIc). It was observed that the prepared composites were not hydrophobic and thus not suitable to be used for applications such as seaweed cultivation. |
| Alginate (4) | 8 | 0.02 | 0.5 | This produced highly water sensitive biodegradable composites named as Alginate/PVA-composite (VIIId). It was observed that the prepared composites were not hydrophobic and thus not suitable to be used for applications such as seaweed cultivation. |

Example 9

Experiments of Example 3, were repeated taking seaweed phycocolloid agarose (6 wt %) which was dissolved in water by autoclave heating at 120 degree Celsius for 30 minutes. To this 0.02 wt % potassium persulphate (KPS) was added under stirring, followed by addition of 16 wt % PVA. The reaction mixture was heated in aqueous medium under reflux conditions at 80 degree Celsius for 5 h with constant stirring. 0.5 wt % glycerol was added into the heated reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water sensitive biodegradable composites named as Agarose/PVA-composites (IXa). It was observed that the prepared composites were not hydrophobic and thus not suitable to be used for applications such as seaweed cultivation.

Example 10

Experiments of Example 1, were repeated taking seaweed phycocolloids agarose (2 wt %) which was dissolved in water by microwave heating at 100 degree Celsius for 15 minutes. To this 0.02 wt % potassium persulphate (KPS) was added under stirring, followed by the addition of 2 wt % vinyl acetate (VAc). The reaction mixture was heated in aqueous medium under reflux conditions at 80 degree Celsius for 5 h under constant stirring and then transferred into the desired hollow vessels/devices/moulds to obtain the desired shapes. The resulting moulded composites were treated with organic solvent at a temperature of 25 degree Celsius to remove the unreacted homopolymer followed by air drying. This produced improved hydrophobicity of the composites named as Agarose/PVAc-composites (Xa). It was observed that the prepared composites are very brittle and non-flexible in nature thus not suitable to be used for applications such as seaweed cultivation.

TABLE 9

Effect of different reaction parameters and other variables in Example 9.

| Seaweed phycocolloid (wt %) | PVA (wt %) | KPS (wt %) | Plasticizer (wt %) | Remarks/Observations |
|---|---|---|---|---|
| Agar (6) | 16 | 0.02 | 0.5 | This produced water sensitive biodegradable composites named as Agar/PVA-composite (IXb). It was observed that the prepared composites were not hydrophobic and thus not suitable to be used for applications such as seaweed cultivation. |
| Semi-refined carrageenan (SRC) (6) | 16 | 0.02 | 0.5 | This produced water sensitive biodegradable composites named as SRC/PVA-composite (IXc). It was observed that the prepared composites were not hydrophobic and thus not suitable to be used for applications such as seaweed cultivation. |
| Alginate (6) | 16 | 0.02 | 0.5 | This produced highly water sensitive biodegradable composites named as Alginate/PVA-composite (IXd). It was observed that the prepared composites were not hydrophobic and thus not suitable to be used for applications such as seaweed cultivation. |

TABLE 10

Effect of different reaction parameters and other variables in Example 10.

| Seaweed phycocolloid (wt %) | VAc (wt %) | KPS (wt %) | Plasticizer (wt %) | Remarks/Observations |
|---|---|---|---|---|
| Agar (2) | 2 | 0.02 | NIL | This produced improved hydrophobicity of the composites named as Agar/PVAc-composites (Xb). It was observed that the prepared composites are very brittle and non-flexible in nature thus not suitable to be used for applications such as seaweed cultivation. |
| Semi-refined carrageenan (SRC) (2) | 2 | 0.02 | NIL | This produced improved hydrophobicity of the composites named as SRC/PVAc-composites (Xc). It was observed that the prepared composites are very brittle and non-flexible in nature thus not suitable to be used for applications such as seaweed cultivation. |
| Alginate (2) | 2 | 0.02 | NIL | This produced improved hydrophobicity of the composites named as Alginate/PVAc-composites (Xd). It was observed that the prepared composites are very brittle and non-flexible in nature thus not suitable to be used for applications such as seaweed cultivation. |

Example 11

Experiments of Example 2, were repeated taking seaweed phycocolloid agarose (4 wt %) which was dissolved in water by autoclave heating at 120 degree Celsius for 30 minutes. To this 0.02 wt % potassium persulphate (KPS) was added under stirring, followed by addition of 8 wt % VAc. The reaction mixture was heated in aqueous medium under reflux conditions at 80 degree Celsius for 5 h with constant stirring and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XIa). It was observed that the prepared composites were brittle, non-flexible and were not suitable to be used for applications such as seaweed cultivation.

Example 12

Experiments of Example 3, were repeated taking seaweed phycocolloid agarose (6 wt %) which was dissolved in water by autoclave heating at 120 degree Celsius for 30 minutes. To this 0.02 wt % potassium persulphate (KPS) was added under stirring, followed by addition of 16 wt % VAc. The reaction mixture was heated in aqueous medium under reflux conditions at 80 degree Celsius for 5 h with constant stirring and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XIIa). It was observed that the prepared composites were brittle, non-flexible and were not suitable to be used for applications such as seaweed cultivation.

TABLE 11

Effect of different reaction parameters and other variables in Example 11.

| Seaweed phycocolloid (wt %) | VAc (wt %) | KPS (wt %) | Plasticizer (wt %) | Remarks/Observations |
|---|---|---|---|---|
| Agar (4) | 8 | 0.02 | NIL | This produced water non sensitive biodegradable composites named as Agar/PVAc-composite (XIb). It was observed that the prepared composites were brittle, non-flexible and thus not suitable to be used for applications such as seaweed cultivation. |
| Semi-refined carrageenan (SRC) (4) | 8 | 0.02 | NIL | This produced water non sensitive biodegradable composites named as SRC/PVAc-composite (XIc). It was observed that the prepared composites were brittle, non-flexible and thus not suitable to be used for applications such as seaweed cultivation. |
| Alginate (4) | 8 | 0.02 | NIL | This produced highly water non sensitive biodegradable composites named as Alginate/PVAc-composite (XId). It was observed that the prepared composites were brittle, non-flexible and thus not suitable to be used for applications such as seaweed cultivation. |

TABLE 12

Effect of different reaction parameters and other variables in Example 12.

| Seaweed phycocolloid (wt %) | VAc (wt %) | KPS (wt %) | Plasticizer (wt %) | Remarks/Observations |
|---|---|---|---|---|
| Agar (6) | 16 | 0.02 | NIL | This produced water non sensitive biodegradable composites named as Agar/PVAc-composite (XIIb). It was observed that the prepared composites were brittle, non-flexible and thus not suitable to be used for applications such as seaweed cultivation. |
| Semi-refined carrageenan (SRC) (6) | 16 | 0.02 | NIL | This produced water non sensitive biodegradable composites named as SRC/PVAc-composite (XIIc). It was observed that the prepared composites were brittle, non-flexible and thus not suitable to be used for applications such as seaweed cultivation. |
| Alginate (6) | 16 | 0.02 | NIL | This produced highly sensitive to water biodegradable composites named as Alginate/PVAc-composite (XIId). It was observed that the prepared composites were brittle, non-flexible and thus not suitable to be used for applications such as seaweed cultivation. |

Example 13

Vinyl acetate 10 wt % was added in 100 ml distilled water. To this 0.02 wt % potassium persulphate (KPS) was added under stirring. The reaction mixture was heated in aqueous medium under reflux conditions at 80 degree Celsius for 5 h with constant stirring. The reaction mixture was then transferred into the desired hollow vessels/devices/moulds to obtain the desired shapes. The resulting polymers were treated with organic solvent at room temperature. These produced polymers named as PVAc (XIII), which dispersed in water, exhibited low strength, and were highly sensitive to organic solvents.

Findings from Examples 1 to 13

Examples 1 to 9 demonstrated that vinylated reagents like AAm, ACN, and PVA produced composites (Ia to IXd), which were water sensitive and thus, were not suitable to be used for water applications such as seaweed cultivation and other similar applications. In addition, Examples 10 to 12 further demonstrated that vinyl acetate used as reagent produced composites (Xa to XIId) with improved hydrophobicity compared to the parent seaweed phycocolloids, which are non-flexible, brittle in nature, and thus not suitable to be used for seaweed cultivation and other potential applications. These findings also revealed that a suitable plasticizer needs to be added to improve the flexibility and smoothness of these composites. Example 13 further demonstrated that vinyl acetate alone used as reagent produced hydrophobic PVAc (XIII) polymers, which are highly sensitive to organic solvents, and hence are not suitable to be used for seaweed cultivation and other applications.

Example 14

Experiments of Example 10, were repeated taking agarose (2 wt %) which was dissolved in water by microwave heating at 100 degree Celsius for 15 minutes. To this 0.02 wt % potassium persulphate (KPS) was added under stirring, followed by addition of 5 wt % vinyl acetate (VAc). The reaction mixture was heated in aqueous medium under reflux conditions at 80 degree Celsius for 5 h with constant stirring. 0.5 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XIVa), which are of low strength and thus not suitable to be used for applications such as seaweed cultivation. Yield of composites: 2.5-5.0 g, containing agarose 40-80 wt %, PVAc 12-45 wt %, glycerol 2-10 wt % and moisture 5-10 wt % [Optimum yield is 5±0.5 g, composition: Seaweed phycocolloids=40±2 wt %, PVAc=45±2 wt %, glycerol 5±1 wt % and moisture 10±1 wt %].

TABLE 14

Effect of different reaction parameters and other variables in Example 14.

| Seaweed phycocolloid (wt %) | VAc (wt %) | KPS (wt %) | Plasticizer (wt %) | Remarks/Observations |
|---|---|---|---|---|
| Agar (2) | 5 | 0.02 | 0.5 | This produced water non sensitive biodegradable composites named as Agar/PVAc-composite (XIVb). It was observed that the prepared composites having improved hydrophobicity and low strength and thus not suitable to be used for applications such as seaweed cultivation. |
| Semi-refined carrageenan (SRC) (2) | 5 | 0.02 | 0.5 | This produced water non sensitive biodegradable composites named as SRC/PVAc-composite (XIVc). It was observed that the prepared composites having improved hydrophobicity and low strength and thus not suitable to be used for applications such as seaweed cultivation. |

TABLE 14-continued

Effect of different reaction parameters and other variables in Example 14.

| Seaweed phycocolloid (wt %) | VAc (wt %) | KPS (wt %) | Plasticizer (wt %) | Remarks/Observations |
|---|---|---|---|---|
| Alginate (2) | 5 | 0.02 | 0.5 | This produced water non sensitive biodegradable composites named as Alginate/PVAc-composite (XIVd). It was observed that the prepared composites having improved hydrophobicity and low strength and thus not suitable to be used for applications such as seaweed cultivation. |

Example 15

Experiments of Example 11, were repeated taking agarose (4 wt %) which was dissolved in water by microwave heating at 100 degree Celsius for 15 minutes. To this 0.02 wt % potassium persulphate (KPS) was added under stirring, followed by addition of 10 wt % vinyl acetate (VAc). The reaction mixture was heated in aqueous medium under reflux conditions at 80 degree Celsius for 5 h with constant stirring. 0.5 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XVa). It was observed that the prepared composites were hydrophobic biodegradable with high strength and thus suitable to be used for applications such as seaweed cultivation. Yield of composites: 4.8-11.2 g, containing agarose 35-86 wt %, PVAc 10-61 wt %, glycerol 5-12 wt % and moisture 7-10 wt % [Optimum yield is 11.2±0.5 g, composition: Seaweed phycocolloids=36±2 wt %, PVAc=50±2 wt %, glycerol 5±1 wt % and moisture 8±1 wt %].

Example 16

Experiments of Example 12, were repeated taking agarose (6 wt %) which was dissolved in water by microwave heating at 100 degree Celsius for 15 minutes. To this 0.02 wt % potassium persulphate (KPS) was added under stirring, followed by addition of 12 wt % vinyl acetate (VAc). The reaction mixture was heated in aqueous medium under reflux conditions at 80 degree Celsius for 5 h with constant stirring. 0.5 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XVIa). It was observed that the prepared composites were hydrophobic biodegradable with high strength and thus suitable to be used for applications such as seaweed cultivation. Yield of composites: 7.5-14.1 g, containing agarose 42-80 wt %, PVAc 13-40 wt %, glycerol 2-8 wt % and moisture 5-10 wt % [Optimum yield is 14.1±0.5 g, composition: Seaweed phycocolloids=43±2 wt %, PVAc=42±2 wt %, glycerol 7±1 wt % and moisture 8±1 wt %].

TABLE 15

Effect of different reaction parameters and other variables in Example 15.

| Seaweed phycocolloid (wt %) | VAc (wt %) | KPS (wt %) | Plasticizer (wt %) | Remarks/Observations |
|---|---|---|---|---|
| Agar (4) | 10 | 0.02 | 0.5 | This produced water non sensitive biodegradable composites named as Agar/PVAc-composite (XVb). It was observed that the prepared composites were hydrophobic biodegradable with high strength and thus suitable to be used for potential applications such as seaweed cultivation. |
| Semi-refined carrageenan (SRC) (4) | 10 | 0.02 | 0.5 | This produced water non sensitive biodegradable composites named as SRC/PVAc-composite (XVc). It was observed that the prepared composites having improved hydrophobicity and low strength and thus not suitable to be used for applications such as seaweed cultivation. |
| Alginate (4) | 10 | 0.02 | 0.5 | This produced water non sensitive biodegradable composites named as Alginate/PVAc-composite (XVd). It was observed that the prepared composites having improved hydrophobicity and low strength and thus not suitable to be used for applications such as seaweed cultivation. |

TABLE 16

Effect of different reaction parameters and other variables in Example 16.

| Seaweed phycocolloid (wt %) | VAc (wt %) | KPS (wt %) | Plasticizer (wt %) | Remarks/Observations |
|---|---|---|---|---|
| Agar (6) | 12 | 0.02 | 0.5 | This produced water non sensitive biodegradable composites named as Agar/PVAc-composite (XVIb). It was observed that the prepared composites were hydrophobic biodegradable with high strength and thus suitable to be used for potential applications such as seaweed cultivation. |
| Semi-refined carrageenan (SRC) (6) | 12 | 0.02 | 0.5 | This produced water non sensitive biodegradable composites named as SRC/PVAc-composite (XVIc). It was observed that the prepared composites having improved hydrophobicity and low strength and thus not suitable to be used for applications such as seaweed cultivation. |
| Alginate (6) | 12 | 0.02 | 0.5 | This produced water non sensitive biodegradable composites named as Alginate/PVAc-composite (XVId). It was observed that the prepared composites having improved hydrophobicity and low strength and thus not suitable to be used for applications such as seaweed cultivation. |

Examples 15 and 16 further demonstrated that seaweed phycocolloids namely agarose and agar (4 and 6 wt %) with VAc produced water non sensitive biodegradable composites (XVa,b and XVIa,b). It was observed that the prepared composites (XVa,b and XVIa,b) were hydrophobic biodegradable with high strength and thus suitable to be used for potential applications such as seaweed cultivation.

Example 17

Experiments of Example 15, were repeated taking hybrid of agarose and semi-refined carrageenans in 1:1 w/w ratio (4 wt %) which was dissolved in water by microwave heating at 100 degree Celsius for 15 minutes. To this 0.02 wt % potassium persulphate (KPS) was added under stirring, followed by addition of 8 wt % vinyl acetate (VAc). The reaction mixture was heated in aqueous medium under reflux conditions at 80 degree Celsius for 5 h with constant stirring. 0.5 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/SRC/PVAc-composites (XVIIa). It was observed that the prepared composites were hydrophobic biodegradable with high strength and thus suitable to be used for applications such as seaweed cultivation. Yields and compositions of the prepared composites are in the range as given in the Example 15.

TABLE 17

Effect of different reaction parameters and other variables in Example 17.

| Hybrid Seaweed phycocolloid (wt %) | VAc (wt %) | KPS (wt %) | Plasticizer (wt %) | Remarks/Observations |
|---|---|---|---|---|
| Agarose/Agar (4) | 8 | 0.02 | 0.5 | This produced water non sensitive biodegradable composites named as Agarose/Agar/PVAc-composite (XVIIb). It was observed that the prepared composites were hydrophobic biodegradable with high strength and thus suitable to be used for potential applications such as seaweed cultivation. |
| Agarose/Alginate (4) | 8 | 0.02 | 0.5 | This produced water non sensitive biodegradable composites named as Agarose/Alginate/PVAc-composite (XVIIc). It was observed that the prepared composites having improved hydrophobicity and low strength and thus not suitable to be used for applications such as seaweed cultivation. |

Example 18

Experiments of Example 16, were repeated taking hybrid of agarose and semi-refined carrageenan (SRC) in 1:1 w/w ratio (6 wt %) which was dissolved in water by microwave heating at 100 degree Celsius for 15 minutes. To this 0.02 wt % potassium persulphate (KPS) was added under stirring, followed by addition of 13 wt % vinyl acetate (VAc). The reaction mixture was heated in aqueous medium under reflux conditions at 80 degree Celsius for 5 h with constant stirring. 0.5 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/SRC/PVAc-composites (XVIIIa). It was observed that the prepared composites were hydrophobic biodegradable with high strength and thus suitable to be used for potential applications such as seaweed cultivation. Yields and compositions of the prepared composites are in the range as given in the Example 16.

TABLE 18

Effect of different reaction parameters and other variables in Example 18.

| Hybrid Seaweed phycocolloids (wt %) | VAc (wt %) | KPS (wt %) | Plasticizer (wt %) | Remarks/Observations |
|---|---|---|---|---|
| Agarose/Agar (6) | 13 | 0.02 | 0.5 | This produced water non sensitive biodegradable composites named as Agarose/Agar/PVAc-composite (XVIIIb). It was observed that the prepared composites were hydrophobic biodegradable with high strength and thus suitable to be used for potential applications such as seaweed cultivation. |
| Agarose/Alginate (6) | 13 | 0.02 | 0.5 | This produced water non sensitive biodegradable composites named as Agarose/Alginate/PVAc-composite (XVIIIc). It was observed that the prepared composites having improved hydrophobicity and low strength and thus not suitable to be used for applications such as seaweed cultivation. |

Example 19

Experiments of Example 15, were repeated taking hybrid of agar and semi-refined carrageenan (SRC) in 1:1 w/w ratio (4 wt %) which was dissolved in water by microwave heating at 100 degree Celsius for 15 minutes. To this 0.02 wt % potassium persulphate (KPS) was added under stirring, followed by addition of 11 wt % vinyl acetate (VAc). The reaction mixture was heated in aqueous medium under reflux conditions at 80 degree Celsius for 5 h with constant stirring. 0.5 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agar/SRC/PVAc-composites (XIXa). It was observed that the prepared composites were hydrophobic biodegradable with high strength and thus suitable to be used for potential applications such as seaweed cultivation. Yields and compositions of the prepared composites are in the range as given in the Example 15.

TABLE 19

Effect of different reaction parameters and other variables in Example 19.

| Hybrid Seaweed phycocolloids (wt %) | VAc (wt %) | KPS (wt %) | Plasticizer (wt %) | Remarks/Observations |
|---|---|---|---|---|
| Agar/Alginate (4) | 11 | 0.02 | 0.5 | This produced water non sensitive biodegradable composites named as Agar/Alginate/PVAc-composite (XIXb). It was observed that the prepared composites having improved hydrophobicity and low strength and thus not suitable to be used for applications such as seaweed cultivation. |

Example 20

Experiments of Example 16, were repeated taking hybrid of agar and semi-refined carrageenan (SRC) in 1:1 w/w ratio (6 wt %) which was dissolved in water by microwave heating at 100 degree Celsius for 15 minutes. To this 0.02 wt % potassium persulphate (KPS) was added under stirring, followed by addition of 9 wt % vinyl acetate (VAc). The reaction mixture was heated in aqueous medium under reflux conditions at 80 degree Celsius for 5 h with constant stirring. 0.5 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agar/SRC/PVAc-composites (XXa). It was observed that the prepared composites were hydrophobic biodegradable with high strength and thus suitable to be used for potential applications such as seaweed cultivation. Yields and compositions of the prepared composites are in the range as given in the Example 16.

persulphate (KPS) was added under stirring, followed by addition of 14 wt % vinyl acetate (VAc). The reaction mixture was heated in aqueous medium under reflux conditions at 80 degree Celsius for 5 h with constant stirring. 0.5 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XXI a & a'). It was observed that the prepared composites were hydrophobic biodegradable with high strength and thus suitable to be used for applications such as seaweed cultivation. [Optimum yields (11.4±0.2 g) and compositions of composites with 4 wt % agarose: containing agarose=36±2 wt %, PVAc=50±2 wt %, glycerol 5±1 wt %

TABLE 20

Effect of different reaction parameters and other variables in Example 20.

| Hybrid Seaweed phycocolloids (wt %) | VAc (wt %) | KPS (wt %) | Plasticizer (wt %) | Remarks/Observations |
|---|---|---|---|---|
| Agar/Alginate (6) | 9 | 0.02 | 0.5 | This produced water non sensitive biodegradable composites named as Agar/Alginate/PVAc-composite (XXb). It was observed that the prepared composites having improved hydrophobicity and low strength and thus not suitable to be used for applications such as seaweed cultivation. |

Example 21

The experiments of Examples 15 and 16 were repeated taking 7 wt % agarose. To this 0.04 wt % potassium and moisture 8±1 wt %; while optimum yields (14.3±0.2 g) and compositions of composites with 6 wt % agarose is: agarose=40±2 wt %, PVAc=49±2 wt %, glycerol 5±1 wt % and moisture 6±1 wt %].

TABLE 21

Effect of different reaction parameters and other variables in Example 21.

| Seaweed phycocolloid (wt %) | VAc (wt %) | KPS (wt %) | Plasticizer (wt %) | Remarks/Observations |
|---|---|---|---|---|
| Agar (7) | 14 | 0.04 | 0.5 | This produced water non sensitive biodegradable composites named as Agar/PVAc-composite (XXIb & b'). It was observed that the prepared composites were hydrophobic biodegradable with high strength and thus suitable to be used for potential applications such as seaweed cultivation. |
| Semi-refined carrageenan (SRC) (7) | 14 | 0.04 | 0.5 | This produced water non sensitive biodegradable composites named as SRC/PVAc-composite (XXIc & c'). It was observed that the prepared composites having improved hydrophobicity and low strength and thus not suitable to be used for applications such as seaweed cultivation. |
| Alginate (7) | 14 | 0.04 | 0.5 | This produced water non sensitive biodegradable composites named as Alginate/PVAc-composite (XXI d & d'). It was observed that the prepared composites having improved hydrophobicity and low strength and thus not suitable to be used for applications such as seaweed cultivation. |

Example 22

The experiments of Examples 15 and 16 were repeated taking 5 wt % agarose. To this 0.08 wt % potassium persulphate (KPS) was added under stirring, followed by addition of 5 wt % vinyl acetate (VAc). The reaction mixture was heated in aqueous medium under reflux conditions at 80 degree Celsius for 5 h with constant stirring. 0.5 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XXIIa & a'). It was observed that the prepared composites were hydrophobic biodegradable with lower strength than the composites (XVa and XVIa) prepared in Examples 15 and 16 and thus not suitable to be used for applications such as seaweed cultivation. [Optimum yields (11.0±0.5 g) and compositions of composites with 4 wt % agarose: containing agarose=35±2 wt %, PVAc=51±2 wt %, glycerol 5±1 wt % and moisture 8±1 wt %; while optimum yields (13.9±0.5 g) and compositions of composites with 6 wt % agarose is: agarose=39±2 wt %, PVAc=50±2 wt %, glycerol 5±1 wt % and moisture 6±1 wt %].

TABLE 22

Effect of different reaction parameters and other variables in Example 22.

| Seaweed phycocolloid (wt %) | VAc (wt %) | KPS (wt %) | Plasticizer (wt %) | Remarks/Observations |
|---|---|---|---|---|
| Agar (5) | 2-16 | 0.08 | 0.5 | This produced water non sensitive biodegradable composites named as Agar/PVAc-composite (XXIIb & b'). It was observed that the prepared composites were hydrophobic biodegradable with lower strength than the composites (XVb and XVIb) prepared in Examples 15 and 16 and thus not suitable to be used for applications such as seaweed cultivation. |
| Semi-refined carrageenan (SRC) (5) | 2-16 | 0.08 | 0.5 | This produced water non sensitive biodegradable composites named as SRC/PVAc-composite (XXIIc & c'). It was observed that the prepared composites were hydrophobic biodegradable with lower strength than the composites (XVc and XVIc) prepared in Examples 15 and 16 and thus not suitable to be used for applications such as seaweed cultivation. |
| Alginate (5) | 2-16 | 0.08 | 0.5 | This produced water non sensitive biodegradable composites named as Alginate/PVAc-composite (XXIId & d'). It was observed that the prepared composites were hydrophobic biodegradable with lower strength than the composites (XV d and XVI d) prepared in Examples 15 and 16 and thus not suitable to be used for applications such as seaweed cultivation. |

Example 23

The experiments of Examples 15 and 16 were repeated taking 4 wt % agarose. To this 0.02 wt % potassium persulphate (KPS) was added under stirring, followed by addition of 9 wt % vinyl acetate (VAc). The reaction mixture was heated in aqueous medium under reflux conditions at 80 degree Celsius for 5 h with constant stirring. 1.5 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XXIIIa & a'). It was observed that the prepared composites were hydrophobic biodegradable with high strength and thus suitable to be used for applications such as seaweed cultivation. Yields and compositions are according to the composites prepared in Examples 15 and 16.

TABLE 23

Effect of different reaction parameters and other variables in Example 23.

| Seaweed phycocolloid (wt %) | VAc (wt %) | KPS (wt %) | Plasticizer (wt %) | Remarks/Observations |
|---|---|---|---|---|
| Agar (4) | 9 | 0.02 | 1.5 | This produced water non sensitive biodegradable composites named as Agar/PVAc-composite (XXIIIb & b'). It was |

TABLE 23-continued

Effect of different reaction parameters and other variables in Example 23.

| Seaweed phycocolloid (wt %) | VAc (wt %) | KPS (wt %) | Plasticizer (wt %) | Remarks/Observations |
|---|---|---|---|---|
| | | | | observed that the prepared composites were hydrophobic biodegradable with high strength and thus suitable to be used for potential applications such as seaweed cultivation |
| Semi-refined carrageenan (SRC) (4) | 9 | 0.02 | 1.5 | This produced water non sensitive biodegradable composites named as SRC/PVAc-composite (XXIIIc & c'). It was observed that the prepared composites having improved hydrophobicity and low strength and thus not suitable to be used for applications such as seaweed cultivation. |
| Alginate (4) | 9 | 0.02 | 1.5 | This produced water non sensitive biodegradable composites named as Alginate/PVAc-composite (XXIIId & d'). It was observed that the prepared composites having improved hydrophobicity and low strength and thus not suitable to be used for applications such as seaweed cultivation. |

Example 24

The experiments of Examples 15 and 16 were repeated taking 4 wt % agarose. To this 0.02 wt % potassium persulphate (KPS) was added under stirring, followed by addition of 14 wt % vinyl acetate (VAc). The reaction mixture was heated in aqueous medium under reflux conditions at 80 degree Celsius for 5 h with constant stirring. 3.0 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XXIVa & a'). It was observed that the prepared composites were hydrophobic biodegradable and slippery thus not suitable to be used for applications such as seaweed cultivation. Yields and compositions are according to the composites prepared in Examples 15 and 16.

Example 25

The experiments of Examples 15 and 16 were repeated taking 6 wt % agarose. To this 0.02 wt % potassium persulphate (KPS) was added under stirring, followed by addition of 12 wt % vinyl acetate (VAc). The reaction mixture was heated in aqueous medium under reflux conditions at 80 degree Celsius for 5 h with constant stirring. 5.0 wt % glycerol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XXVa & a'). It was observed that the prepared composites were hydrophobic biodegradable and leaching of plasticizer make them slippery and weaken thus not suitable to be used for applications such as seaweed cultivation. Yields and compositions are according to the composites prepared in Examples 15 and 16.

TABLE 24

Effect of different reaction parameters and other variables in Example 24.

| Seaweed phycocolloid (wt %) | VAc (wt %) | KPS (wt %) | Plasticizer (wt %) | Remarks/Observations |
|---|---|---|---|---|
| Agar (4) | 14 | 0.02 | 3.0 | This produced water non sensitive biodegradable composites named as Agar/PVAc-composite (XXIVb & b'). It was observed that the prepared composites were hydrophobic biodegradable with high strength and thus suitable to be used for potential applications such as seaweed cultivation |
| Semi-refined carrageenan (SRC) (4) | 14 | 0.02 | 3.0 | This produced water non sensitive biodegradable composites named as SRC/PVAc-composite (XXIVc & c'). It was observed that the prepared composites having improved hydrophobicity and low strength and thus not suitable to be used for applications such as seaweed cultivation. |
| Alginate (4) | 14 | 0.02 | 3.0 | This produced water non sensitive biodegradable composites named as Alginate/PVAc-composite (XXIVd & d'). It was observed that the prepared composites having improved hydrophobicity and low strength and thus not suitable to be used for applications such as seaweed cultivation. |

TABLE 25

Effect of different reaction parameters and other variables in Example 25.

| Seaweed phycocolloid (wt %) | VAc (wt %) | KPS (wt %) | Plasticizer (wt %) | Remarks/Observations |
|---|---|---|---|---|
| Agar (6) | 12 | 0.02 | 5.0 | This produced water non sensitive biodegradable composites named as Agar/PVAc-composite (XXVb & b'). It was observed that the prepared composites were hydrophobic biodegradable and leaching of plasticizer make them slippery and weaken thus not suitable to be used for applications such as seaweed cultivation. |
| Semi-refined carrageenan (SRC) (6) | 12 | 0.02 | 5.0 | This produced water non sensitive biodegradable composites named as SRC/PVAc-composite (XXVc & c'). It was observed that the prepared composites were hydrophobic biodegradable and leaching of plasticizer make them slippery and weaken thus not suitable to be used for applications such as seaweed cultivation. |
| Alginate (6) | 12 | 0.02 | 5.0 | This produced water non sensitive biodegradable composites named as Alginate/PVAc-composite (XXVd & d'). It was observed that the prepared composites were hydrophobic biodegradable and leaching of plasticizer make them slippery and weaken thus not suitable to be used for applications such as seaweed cultivation. |

Example 26

The experiments of Examples 15 and 16 were repeated taking 4 wt % agarose. To this 0.02 wt % potassium persulphate (KPS) was added under stirring, followed by addition of 12 wt % vinyl acetate (VAc). The reaction mixture was heated in aqueous medium under reflux conditions at 80 degree Celsius for 5 h with constant stirring. 0.5 wt % sorbitol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XXVIa & a'). It was observed that the prepared composites were hydrophobic biodegradable with high strength and thus suitable to be used for applications such as seaweed cultivation. Yields and compositions are according to the composites prepared in Examples 15 and 16.

Example 27

The experiments of Examples 15 and 16 were repeated taking 6 wt % agarose. To this 0.02 wt % potassium persulphate (KPS) was added under stirring, followed by addition of 14 wt % vinyl acetate (VAc). The reaction mixture was heated in aqueous medium under reflux conditions at 80 degree Celsius for 5 h with constant stirring. 1.5 wt % sorbitol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XXVIIa & a'). It was observed that the prepared composites were hydrophobic biodegradable with high strength and thus suitable to be used for applications such as seaweed cultivation. Yields and compositions are according to the composites prepared in Examples 15 and 16.

TABLE 26

Effect of different reaction parameters and other variables in Example 26.

| Seaweed phycocolloid (wt %) | VAc (wt %) | KPS (wt %) | Plasticizer (wt %) | Remarks/Observations |
|---|---|---|---|---|
| Agar (4) | 12 | 0.02 | 0.5 | This produced water non sensitive biodegradable composites named as Agar/PVAc-composite (XXVIb & b'). It was observed that the prepared composites were hydrophobic biodegradable with high strength and thus suitable to be used for potential applications such as seaweed cultivation |
| Semi-refined carrageenan (SRC) (4) | 12 | 0.02 | 0.5 | This produced water non sensitive biodegradable composites named as SRC/PVAc-composite (XXVIc & c'). It was observed that the prepared composites having improved hydrophobicity and low strength and thus not suitable to be used for applications such as seaweed cultivation. |
| Alginate (4) | 12 | 0.02 | 0.5 | This produced water non sensitive biodegradable composites named as Alginate/PVAc-composite (XXVI d & d'). It was observed that the prepared composites having improved hydrophobicity and low strength and thus not suitable to be used for applications such as seaweed cultivation. |

TABLE 27

Effect of different reaction parameters and other variables in Example 27.

| Seaweed phycocolloid (wt %) | VAc (wt %) | KPS (wt %) | Plasticizer (wt %) | Remarks/Observations |
|---|---|---|---|---|
| Agar (6) | 14 | 0.02 | 1.5 | This produced water non sensitive biodegradable composites named as Agar/PVAc-composite (XXVIIb & b'). It was observed that the prepared composites were hydrophobic biodegradable with high strength and thus suitable to be used for potential applications such as seaweed cultivation |
| Semi-refined carrageenan (SRC) (6) | 14 | 0.02 | 1.5 | This produced water non sensitive biodegradable composites named as SRC/PVAc-composite (XXVIIc & c'). It was observed that the prepared composites having improved hydrophobicity and low strength and thus not suitable to be used for applications such as seaweed cultivation. |
| Alginate (6) | 14 | 0.02 | 1.5 | This produced water non sensitive biodegradable composites named as Alginate/PVAc-composite (XXVII d & d'). It was observed that the prepared composites having improved hydrophobicity and low strength and thus not suitable to be used for applications such as seaweed cultivation. |

Example 28

The experiments of Examples 15 and 16 were repeated taking 6 wt % agarose. To this 0.02 wt % potassium persulphate (KPS) was added under stirring, followed by addition of 10 wt % vinyl acetate (VAc). The reaction mixture was heated in aqueous medium under reflux conditions at 80 degree Celsius for 5 h with constant stirring. 3.0 wt % sorbitol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XXVIIIa & a'). It was observed that the prepared composites were hydrophobic biodegradable and slippery thus not suitable to be used for applications such as seaweed cultivation. Yields and compositions are according to the composites prepared in Examples 15 and 16.

Example 29

The experiments of Examples 15 and 16 were repeated taking 4 wt % agarose. To this 0.02 wt % potassium persulphate (KPS) was added under stirring, followed by addition of 8 wt % vinyl acetate (VAc). The reaction mixture was heated in aqueous medium under reflux conditions at 80 degree Celsius for 5 h with constant stirring. 0.5 wt % ethylene glycol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XXIXa & a'). It was observed that the prepared composites were hydrophobic biodegradable with high strength and thus suitable to be used for applications such as seaweed cultivation. Yields and compositions are according to the composites prepared in Examples 15 and 16.

TABLE 28

Effect of different reaction parameters and other variables in Example 28.

| Seaweed phycocolloid (wt %) | VAc (wt %) | KPS (wt %) | Plasticizer (wt %) | Remarks/Observations |
|---|---|---|---|---|
| Agar (6) | 10 | 0.02 | 3.0 | This produced water non sensitive biodegradable composites named as Agar/PVAc-composite (XXVIIIb & b'). It was observed that the prepared composites were hydrophobic biodegradable and slippery thus not suitable to be used for applications such as seaweed cultivation. |
| Semi-refined carrageenan (SRC) (6) | 10 | 0.02 | 3.0 | This produced water non sensitive biodegradable composites named as SRC/PVAc-composite (XXVIIIc & c'). It was observed that the prepared composites were hydrophobic biodegradable and slippery thus not suitable to be used for applications such as seaweed cultivation. |
| Alginate (6) | 10 | 0.02 | 3.0 | This produced water non sensitive biodegradable composites named as Alginate/PVAc-composite (XXVIII d & d'). It was observed that the prepared composites were hydrophobic biodegradable and slippery thus not suitable to be used for applications such as seaweed cultivation. |

TABLE 29

Effect of different reaction parameters and other variables in Example 29.

| Seaweed phycocolloid (wt %) | VAc (wt %) | KPS (wt %) | Plasticizer (wt %) | Remarks/Observations |
|---|---|---|---|---|
| Agar (4) | 8 | 0.02 | 0.5 | This produced water non sensitive biodegradable composites named as Agar/PVAc-composite (XXIXb & b'). It was observed that the prepared composites were hydrophobic biodegradable with high strength and thus suitable to be used for potential applications such as seaweed cultivation |
| Semi-refined carrageenan (SRC) (4) | 8 | 0.02 | 0.5 | This produced water non sensitive biodegradable composites named as SRC/PVAc-composite (XXIXc & c'). It was observed that the prepared composites having improved hydrophobicity and low strength and thus not suitable to be used for applications such as seaweed cultivation. |
| Alginate (4) | 8 | 0.02 | 0.5 | This produced water non sensitive biodegradable composites named as Alginate/PVAc-composite (XXIXd & d'). It was observed that the prepared composites having improved hydrophobicity and low strength and thus not suitable to be used for applications such as seaweed cultivation. |

Example 30

The experiments of Examples 15 and 16 were repeated taking 8 wt % agarose. To this 0.02 wt % potassium persulphate (KPS) was added under stirring, followed by addition of 10 wt % vinyl acetate (VAc). The reaction mixture was heated in aqueous medium under reflux conditions at 80 degree Celsius for 5 h with constant stirring. 1.5 wt % ethylene glycol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XXXa & a'). It was observed that the prepared composites were hydrophobic biodegradable with high strength and thus suitable to be used for applications such as seaweed cultivation. Yields and compositions are according to the composites prepared in Examples 15 and 16.

TABLE 30

Effect of different reaction parameters and other variables in Example 30.

| Seaweed phycocolloid (wt %) | VAc (wt %) | KPS (wt %) | Plasticizer (wt %) | Remarks/Observations |
|---|---|---|---|---|
| Agar (8) | 10 | 0.02 | 1.5 | This produced water non sensitive biodegradable composites named as Agar/PVAc-composite (XXXb & b'). It was observed that the prepared composites were hydrophobic biodegradable with high strength and thus suitable to be used for potential applications such as seaweed cultivation |
| Semi-refined carrageenan (SRC) (8) | 10 | 0.02 | 1.5 | This produced water non sensitive biodegradable composites named as SRC/PVAc-composite (XXXc & c'). It was observed that the prepared composites having improved hydrophobicity and low strength and thus not suitable to be used for applications such as seaweed cultivation. |
| Alginate (8) | 10 | 0.02 | 1.5 | This produced water non sensitive biodegradable composites named as Alginate/PVAc-composite (XXXd & d'). It was observed that the prepared composites having improved hydrophobicity and low strength and thus not suitable to be used for applications such as seaweed cultivation. |

Example 31

The experiments of Examples 15 and 16 were repeated taking 8 wt % agarose. To this 0.02 wt % potassium persulphate (KPS) was added under stirring, followed by addition of 10 wt % vinyl acetate (VAc). The reaction mixture was heated in aqueous medium under reflux conditions at 80 degree Celsius for 5 h with constant stirring. 3.0 wt % ethylene glycol was added into the reaction mixture and then transferred into the desired hollow vessels/devices/moulds to obtain the desired shapes. The resulting moulded composites were treated with organic solvent at a temperature of 25 degree Celsius to remove the unreacted homopolymer followed by air drying. This produced water non sensitive biodegradable composites named as Agarose/PVAc-composites (XXXIa & a'). It was observed that the prepared composites were hydrophobic biodegradable and slippery thus not suitable to be used for applications such as seaweed cultivation. Yields and compositions are according to the composites prepared in Examples 15 and 16.

TABLE 31

Effect of different reaction parameters and other variables in Example 31.

| Seaweed phycocolloid (wt %) | VAc (wt %) | KPS (wt %) | Plasticizer (wt %) | Remarks/Observations |
|---|---|---|---|---|
| Agar (8) | 10 | 0.02 | 3.0 | This produced water non sensitive biodegradable composites named as Agar/PVAc-composite (XXXIb & b'). It was observed that the prepared composites were hydrophobic biodegradable and slippery thus not suitable to be used for applications such as seaweed cultivation. |
| Semi-refined carrageenan (SRC) (8) | 10 | 0.02 | 3.0 | This produced water non sensitive biodegradable composites named as SRC/PVAc-composite (XXXIc & c'). It was observed that the prepared composites were hydrophobic biodegradable and slippery thus not suitable to be used for applications such as seaweed cultivation. |
| Alginate (8) | 10 | 0.02 | 3.0 | This produced water non sensitive biodegradable composites named as Alginate/PVAc-composite (XXXId & d'). It was observed that the prepared composites were hydrophobic biodegradable and slippery thus not suitable to be used for applications such as seaweed cultivation. |

Example 32

The hydrophobic biodegradable composites prepared in Examples 14-31 were treated with color reducing food grade dyes namely Brilliant Blue FCF, Allura Red AC, and Tartrazine, etc. to obtain desired colored ropes for making decorative or attractive household items (FIG. 1).

Example 33

Reaction mixtures obtained in Examples 14-20 were tested for their biodegradability using moist soil test after casting in the form of films and ropes. The films got degraded within 20-45 days; whiles ropes took longer duration in the range of 90 to 600 day to degrade completely. This Example revealed that materials obtained in the above Examples are biodegradable and eco-friendly.

Example 34

Figure 2:
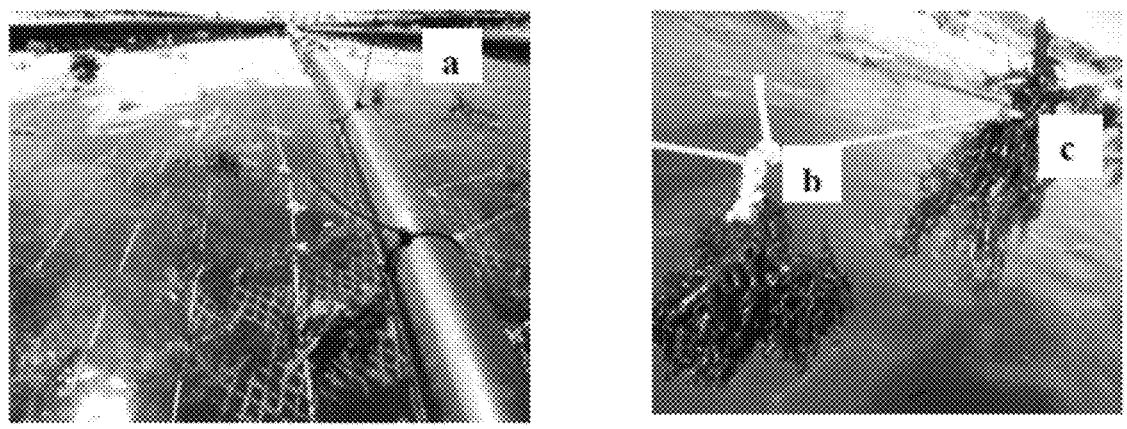
FIG. 2 illustrates (a) cultivation of *Kappaphycus alvarezii* on the biodegradable hydrophobic ropes by the raft method, (b) cultivated plant in biodegradable hydrophobic composites based ropes of Examples 15 and 16, and (c) cultivated plant in synthetic ropes. The plant growth was higher in biodegradable ropes compared to synthetic ropes.

The hydrophobic biodegradable composites prepared in Examples 15 and 16 were used for seaweed cultivation in seawater environment. For this, *Kappaphycus alvarezii* was collected from south east coast (Thoniturai, 79° 10'29"E-9° 16'21"N), Mandapam-623 519, Tamil Nadu, India, and was cultivated at Thoniturai, 79° 10'29"E-9° 16'21"N on the biodegradable hydrophobic ropes prepared from the composites of Examples 15 and 16 and fixed with planting rope (8 mm diameter which was Garware polypropylene rope). The plant was allowed to grow in open sea water and periodical observations were made to ensure the acclimatization of the biodegradable rope in marine environment. It was observed that the growth of the plants was normal and was comparable with plants grown by common methods adopted for commercial cultivation of Kappaphycus using 0.5 mm dia braider for tie-tie method. After 35 days the total biomass and daily growth rate (DGR %) were 480 grams and 4.48% respectively in the biodegradable ropes. The same plant was also grown in braider as well as on the combination of braider and biodegradable ropes, and the total biomass was observed to be 390 (DGR 3.88%) and 425.5 (DGR 4.13%), respectively, which was lesser as compared to seaweed phycocolloids based ropes (Table 32 & FIG. 2).

TABLE 32

Performance of hydrophobic ropes during seaweed cultivation (*Kappaphycus alvarezii*) in the open Sea at Mandapam, Tamil Nadu.

| Sr. No. | Braider | Braider & Biodegradable rope | Biodegradable rope |
|---|---|---|---|
| Initial weight (gm) | 100.0 | 100.0 | 100.0 |
| Fresh weight after 35 days | 390.0 | 425.5 | 480.0 |
| DGR %/day | 3.88 | 4.13 | 4.48 |

Example 35

Figure 3:
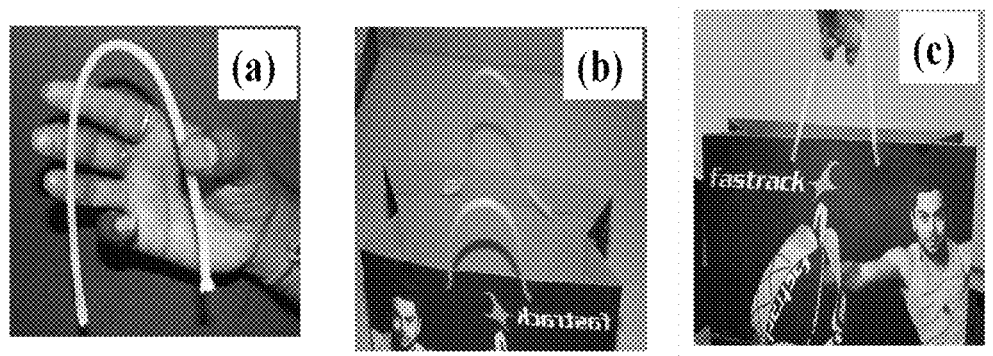
FIG. 3 illustrates (a) flexibility property of biodegradable ropes, (b) empty carry bag with handle of ropes of Examples 14-20, and (c) 5 kg weight in carry bag with handles of ropes of Examples 14-20.

The hydrophobic biodegradable composites prepared in Examples 14-20 were used as handles of carry bags, which have capacity to carry 2-5 kg weight (FIG. 3). Seaweed polysaccharides based handles offers superior feeling when carrying bags compared to synthetic handles. No adverse effects were observed on using handles of ropes prepared in Examples 14-20 up to 3 months. After 3 months there is no considerable effect on the performance and quality of biodegradable ropes. These are eco-friendly and easy to dispose off in the open environment.

Example 36

Figure 4:
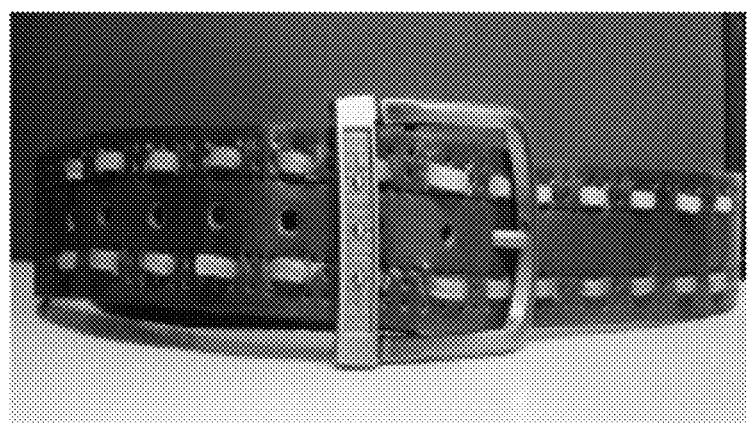
FIG. 4 illustrates leather belt with beautiful designs made of biodegradable composites ropes of Examples 14-31.

The hydrophobic biodegradable composites prepared as per the procedure of Example 14-31 were used as biodegradable design e.g. in designing belts, bags and other leather or cloth items (FIG. 4). It offers very smooth and soft feeling while wearing belts with biodegradable design compared to synthetic handles. Even after 2 months, there was no considerable change in the performance and quality of these designs.

Example 37

Figure 5:
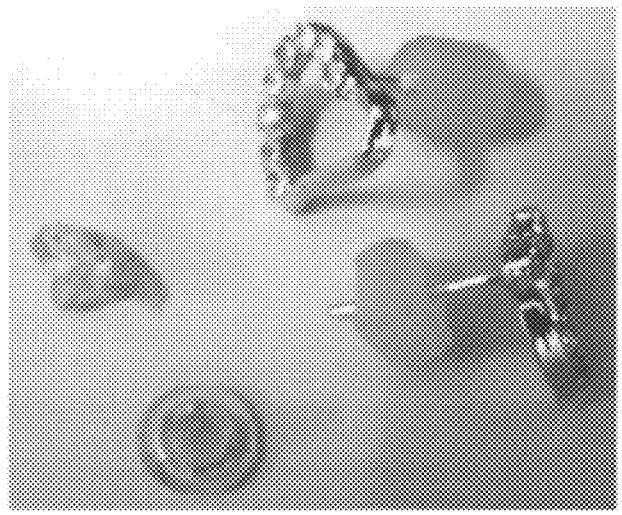
FIG. 5 illustrates stud caps made of biodegradable composites ropes of Examples 14-31.

The hydrophobic biodegradable composites prepared as per the procedure of Example 14-31 were used as biodegradable cap of studs (FIG. 5). Stud cap of biodegradable ropes offers superior feeling when worn in ear compared to synthetic one. Even after 2 months there was no adverse effect or any allergic effect on the skin of the ear.

Example 38

Figure 6:
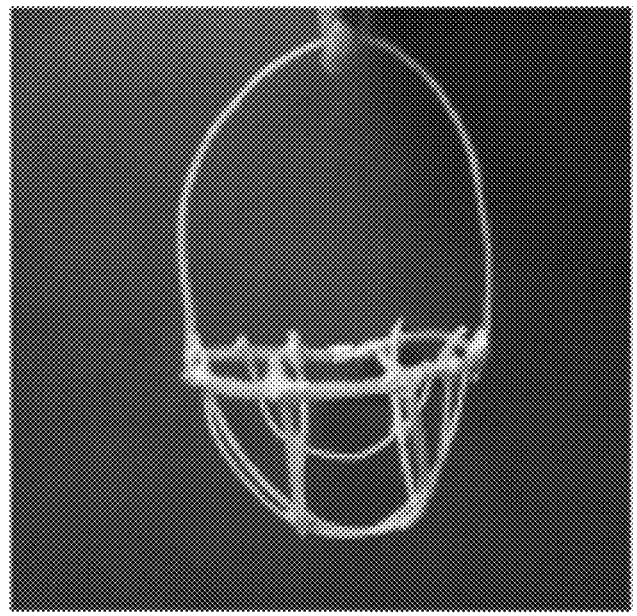
FIG. 6 illustrates bowl/basket made of biodegradable composites rope of Examples 14-31.

The hydrophobic biodegradable composites prepared as per the procedure of Example 14-31 were used for the preparation of biodegradable bowl, which has capacity to carry 2-5 kg weight (FIG. 6). It was observed that it offer attractive look while in use of keeping vegetables and fruits in biodegradable bowl compared to synthetic. Even after 9 months there was no considerable change in the performance and quality of the biodegradable bowls.

Example 39

Figure 7:
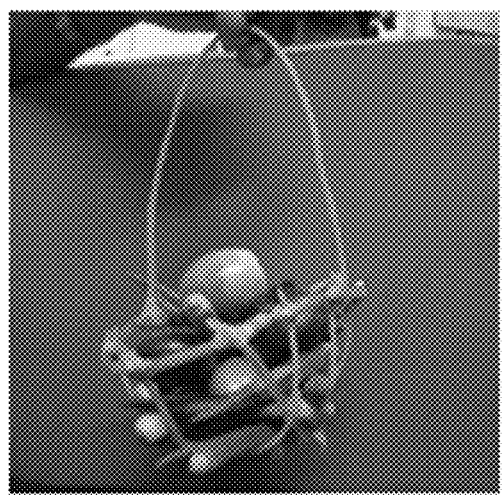
FIG. 7 illustrates storage of vegetables in bowl/basket made of biodegradable composites ropes of Example 38.

The bowl prepared as per Example 38 was used as biodegradable bowl for storage of vegetable and fruits items, which has the capacity to carry 2-5 kg weight (FIG. 7). It was observed that it offers attractive look in house when vegetable and fruits were kept in biodegradable bowl as compared to synthetic. Even after 9 months there was no considerable change in the performance and quality of the biodegradable bowls.

Example 40

Figure 8:
FIG. 8 illustrates storage of bakery items in bowl/basket made of biodegradable composites ropes of Example 38.

The bowl prepared as per Example 38 was used as biodegradable bowl for storage of biscuits, chips and other food packets, which has the capacity to carry 2-5 kg weight (FIG. 8). It was observed that it offers attractive look in house when biscuit and chips and other food packets were kept in biodegradable bowl as compared to synthetic. Even after 9 months there was no considerable change in the performance and quality of the biodegradable bowls.

Example 41

Figure 9:
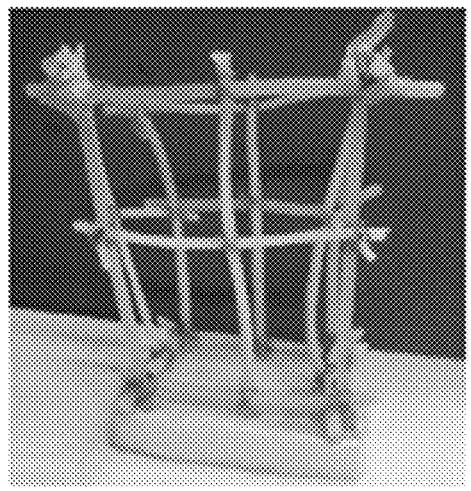
FIG. 9 illustrates decorative pot/jar made of biodegradable composites ropes of Examples 14-31.
Figure 10:
FIG. 10 illustrates flowers in decorative pot/jar made of biodegradable composites ropes of Example 41.

The hydrophobic biodegradable composites prepared as per the procedure of Examples 14-20 were used as biodegradable flower pots/jars, which provided good looks and feeling (FIGS. 9 and 10). It was observed that it offers attractive look in house when flowers were kept in biodegradable pots/jars. Even after 11 months there was no considerable change in the performance and quality of the biodegradable flower pots/jars.

Example 42

Figure 11:
FIG. 11 illustrates hand belts/bracelet made of biodegradable composites ropes of Examples 14-31.

The hydrophobic biodegradable composites prepared in Examples 14-31 were used for making biodegradable gift items including hand belts (FIG. 11). It was observed that it offered attractive look in hands. Even after 6 months there was no adverse effect on the skin as well as the performance and quality of the biodegradable hand belts.

Example 43

Figure 12:
FIG. 12 illustrates the drying of cloths on biodegradable composites ropes of Examples 15 and 16.

The hydrophobic biodegradable composites prepared in Examples 15 and 16 were used for drying of cloths in environmental conditions (FIG. 12). It was observed that it offered attractive look in houses and no rusting was observed even after 3 months of use. After 3 months there was no adverse change on the smoothness as well as on the performance and quality of the hydrophobic biodegradable composites.

Advantages of the Invention

Recognizing the fact that seaweed cultivation inevitably requires use of ropes and that non-biodegradability of available ropes can pose a serious environmental threat where cultivation is undertaken on a very large scale, leading to massive problem of pollution with the generated solid waste, the present invention provides a solution to said problem by providing biodegradable hydrophobic composites which can be moulded in form of ropes that can be well used for seaweed cultivation.

By blending monomers such as vinyl acetate onto the seaweed polymers it is possible to impart enhanced hydrophobicity to the prepared composites without compromising excessively on their biodegradability, especially in soil.

The prepared biodegradable hydrophobic composites exhibit high thermal stability which allows them to be sterilized at high temperature for wider applications such as in pharmaceutical applications.

The prepared biodegradable hydrophobic composites exhibit stability in water up to 90 degree Celsius which may be used for wider aqueous applications such as cultivation of seaweeds in open sea water.

We claim:

1. A hydrophobic biodegradable composite prepared from a seaweed derived polysaccharide through a grafting reaction with vinyl acetate comprising:
   [a] seaweed derived polysaccharide in the range of 30 to 80 wt %;
   [b] vinyl acetate in the range of 8 to 60 wt %; and
   [c] plasticizer in the range of 2 to 15 wt %;
   wherein, the plasticizer is selected from the group consisting of glycerol, ethylene glycol, and sorbitol; and
   wherein moisture content of said composite is in the range of 5 to 15 wt %.

2. The composite as claimed in claim 1, wherein the seaweed derived polysaccharide is selected from the group consisting of agar, agarose, alginate, and carrageenan.

3. The composite as claimed in claim 1, wherein the seaweed derived polysaccharide is either used alone or as a blend of seaweed derived polysaccharides.

4. The composite as claimed in claim 1, wherein the seaweed derived polysaccharide is agar and/or agarose.

5. The composite as claimed in claim 1, wherein the plasticizer is glycerol.

6. A process for the preparation of the composites as claimed in claim 1, the process comprising:
   [a] dissolving 1 to 8 wt % of the seaweed derived polysaccharide or a blend of seaweed derived polysaccharides in distilled water by heating at a temperature in the range of 100 to 120 degrees Celsius for 5 to 30 minutes to obtain a homogeneous solution;

[b] adding 0.01 to 0.10 wt % potassium persulphate to the homogeneous solution as obtained in step [a] under stirring followed by addition of 2 to 16 wt % vinyl acetate and heating at a temperature in the range of 60 to 85 degrees Celsius in aqueous medium under reflux conditions for 3 to 7 hours under constant stirring to obtain a reaction mixture;

[c] adding 0.5 to 5.0 wt % plasticizer into the reaction mixture as obtained in step [b] and transferring the contents into a hollow or tubular device or mould to obtain a moulded composite;

[d] treating the moulded composite as obtained in step [c] with an organic solvent at a temperature in the range of 20 to 30 degrees Celsius to remove unreacted homopolymer followed by air drying to obtain the hydrophobic biodegradable composite.

7. The process as claimed in claim 6, wherein the hollow or tubular device or mould is made of glass, plastic, steel, or wood.

8. The process as claimed in claim 6, wherein the organic solvent is selected from the group consisting of isopropyl alcohol, acetone, methanol, ethanol, ethyl acetate, and tetra hydro furan.

* * * * *